Aug. 16, 1966  J. SCHAEFER  3,267,356
SATURABLE REACTOR CURRENT CONTROL SYSTEM
Filed March 4, 1963

INVENTOR.
JOHANNES SCHAEFER
BY
OSTROLENK, FABER, GERB & SOFFEN
ATTORNEYS

United States Patent Office 3,267,356
Patented August 16, 1966

3,267,356
SATURABLE REACTOR CURRENT
CONTROL SYSTEM
Johannes Schaefer, Philadelphia, Pa., assignor to I-T-E
Circuit Breaker Company, Philadelphia, Pa., a corporation of Pennsylvania
Filed Mar. 4, 1963, Ser. No. 262,531
4 Claims. (Cl. 323—89)

This invention relates to a regulator circuit, and more specifically relates to a regulator circuit for maintaining a constant output current of an electrical device.

Constant current regulators are well known to the art. Generally, different desired regulation operation such as high speed or high accuracy and other parameters require a different type of regulator system. In the specific case of controlling the output current of a rectifier which supplies current for the magnet of a particle accelerator, it is particularly important that the magnet current be kept as constant as possible. The magnet current, however, will be affected by many outside influences, some of which are slow-changing influences, and others of which are rapidly-changing influences. By way of example, temperature change or other effects which influence the resistance of the magnet will result in relatively slow current changes, thus the regulator circuitry does not have to be a high speed system to maintain the current constant under such influences. Another type of influence would be fluctuations in the input voltage to the rectifier which must be counteracted by fast-acting regulator means.

In order to provide a regulator circuit which will have the desired response to either type of rapid or slow fluctuation, relatively expensive systems must be used. Thus, in the case of control due to rapidly changing influences, the control circuit must have a high speed of response. However, the device sensing the current error is usually a D.-C. transductor which has an inherent time decay which would radically affect the gain and response of the circuitry required for control of rapid fluctuations in current.

The principle of the present invention is to provide a relatively simple control circuit for such applications as those described above wherein the complete system is divided into two separate circuit systems which superimpose their output control currents on the ultimate control means of the rectifier. The first of the circuits is designed for high speed of response with moderate sensitivity, while the other is treated for high accuracy and minimum drift. Thus, each of the sub-systems of the novel control current circuit can be individually designed for its specific duty.

Accordingly, a primary object of this invention is to provide a novel constant current regulating circuit which is simple and inexpensive.

Another object of this invention is to provide a novel current control circuit in which the functions of response to fluctuations in line voltage are separated from functions which operate in response to slow changes due to temperature.

A still further object of this invention is to provide a simple current control circuit for controlling the current applied to a particle accelerator magnet.

Yet another object of this invention is to provide a novel control circuit which is simple in arrangement which can be designed to compensate for rapid changes in line voltage and for slow changes due to temperature changes.

These and other objects of this invention will become apparent from the following description when taken in connection with the drawings, in which:

FIG. 1 schematically illustrates the separated control functions utilized in the novel current control circuit.

Figure 1:
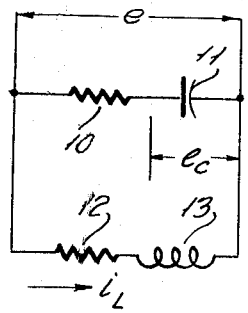

Referring first to FIG. 1, I have illustrated therein a schematic circuit of a device which has an input voltage $e$ supplied to a parallel connected resistance-capacitance circuit having resistor 10 and capacitor 11, and resistance-inductance circuit having resistor 12 and inductance 13.

The current is to be maintained constant. This requires a device sensing the current error. Since the current is high the sensing device will be a D.-C. transductor. Since the current may change rapidly (if the line voltage changes rapidly) this device has to be a high speed D.-C. transductor. Such a transductor is very expensive and encounters a rather complex circuitry. Therefore, the idea is to represent the current by another quantity which can be derived by a simple circuit and without any additional time delay, and which shows the same fast changes as the current does and, hence, can be used as a signal for controlling the current. This quantity is the voltage across the capacitor 11 in FIG. 1. However, this voltage does not show the changes of the current caused by resistance changes due to changes of the temperature. Therefore, an additional circuit is needed which senses the real current error and corrects the operation of the first circuit. This circuit employs a D.-C. transductor. Since the changes of temperature occur slowly, the inherent time delay caused by the transductor does not affect the quality of the control, and a transductor with no special requirements for speed, this means an inexpensive, simple type can be used.

Under steady state conditions, a current $i_L$ flows through resistance 12 (assuming that the resistance of inductance 13 is lumped into resistance 12), while a voltage $e_c$ which its equal to the input voltage $e$ under steady state conditions appears across capacitor 11.

During transient conditions, however, where the voltage $e$ changes, a certain amount of voltage will be absorbed by inductance 13 which dictates the rate of current change. At the same time, the resistance 10 must permit a charging current to flow so that the capacitor voltage $e_c$ adjusts to its new value where this provides information for the control function.

Figure 2:
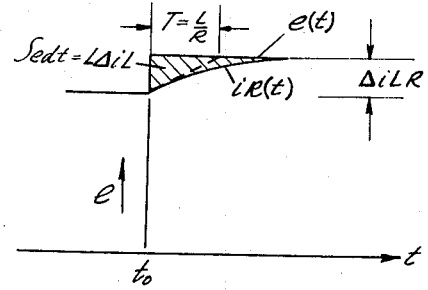
FIG. 2 illustrates a change in voltage as a function of time for the resistance-inductance circuit of FIG. 1.
Figure 3:
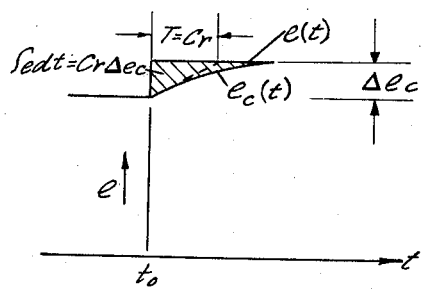
FIG. 3 illustrates a change in voltage as a function of time for the resistance-capacitance circuit of FIG. 1.

FIGURES 2 and 3 graphically illustrate voltage $e$ as a function of time where there is a sudden change in input voltage $e$ which has a step function. Assuming that the two circuits of FIG. 1 have equal time constants, the variations in the capacitor voltage $e_c$ of FIG. 3 correspond identically to the current changes through the circuit so that at any instant the voltage of capacitor 11 will be directly proportional to the current.

Utilizing this concept in a regulation system with the resistance 12 and inductance 13 representing the resistance and inductance of a large magnet excited by the load current $i_L$ of a rectifier, then the capacitive circuit will furnish a signal for controlling this load current. It should be noted that no special transductor is involved and no filtering is required so that no additional time delay is introduced into the system, and a theoretically ideal signal for control of the currrent $i_L$ is obtained with a minimum of components.

In an actual circuit, and in order to maintain the current $i_L$ at a constant value, the voltage of the capacitor 11 must be maintained constant, for which purpose a reference voltage can be utilized with the difference between the capacitor voltage and reference voltage controlling the rectifier output. This will then take care of any line voltage fluctuations with a minimum of delaying devices so that this circuit can be easily made to be extremely rapid in response, sensitive and stable.

This, however, by itself could not compensate for the relatively slow changes which occur due to change of the load resistance with a constant line voltage so that a second circuit used for measuring the actual current error and correcting the operation of the first circuit is utilized. Note that this second circuit can be highly accurate and has no requirement for speed, since those changes which it is to correct occur slowly. Thus, this second circuit may correct the operation of the capacitor circuit without intricate stabilizing means.

Figure 4:
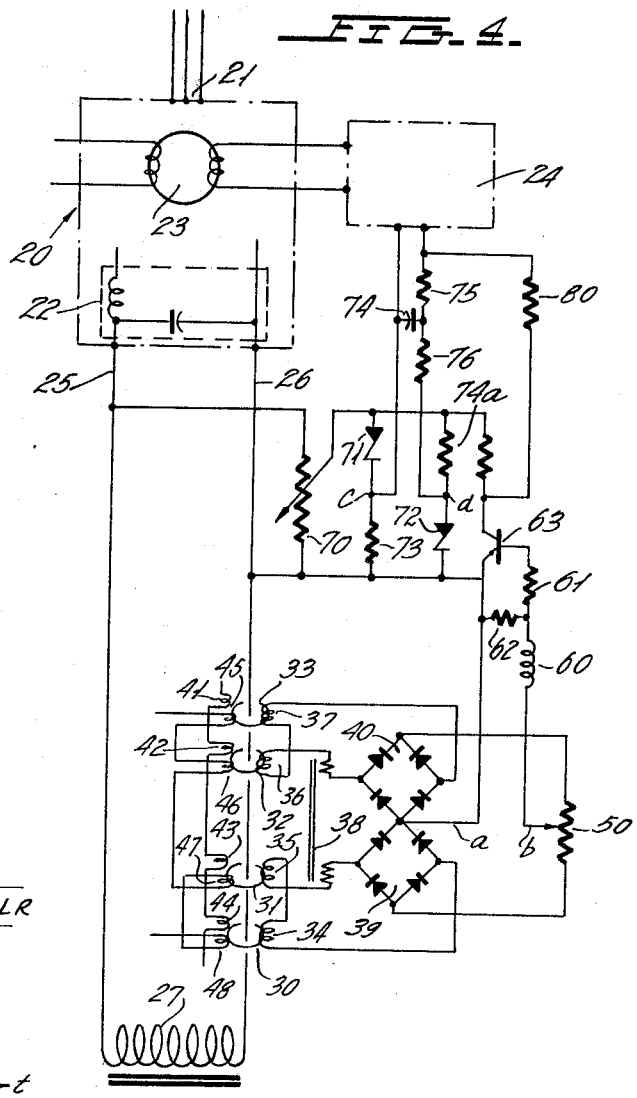
FIG. 4 illustrates the manner in which the control circuit of FIG. 1 can be applied to a rectifier which supplies the output current for a particle accelerator magnet.

FIG. 4 illustrates the manner in which the concepts presented in FIGS. 1, 2 and 3 may be utilized in an actual rectifier circuit which provides a load current for a magnet.

Referring now to FIG. 4, I have schematically illustrated therein a rectifier 20, shown in the dotted block, which is energized from a multiphase A.-C. source 21 and includes usual filter means 22 in the output thereof for providing a smooth D.-C. output current. A schematically illustrated control means formed of a saturable-type reactor system 23 is contained within the rectifier, and is operable to control the output of the rectifier in response to signals applied from the regulator amplifier 24 which may be of any desired type. It is to be noted that those devices described to this point may be of any standard variety well known to those skilled in the art, it only being necessary that the rectifier output appearing on buses 25 and 26 be controlled by the output of amplifier 24.

Buses 25 and 26 are then connected to the magnet winding 27 which could be the magnet of any typical particle accelerator.

In order to measure the current flowing to magnet winding 22 and thus the current error, a differential current measuring transductor system is provided which includes two pairs of transductor cores 30–31 and 32–33 which have windings 34, 35, 36 and 37 respectively connected to an excitation transformer 38 in the usual manner and in further series connection with rectifiers 39 and 40.

The load current through bus 26 which forms one winding for each of cores 30 through 33 is balanced by a constant reference current applied to series connected windings 41, 42, 43 and 44, while a bias current connected to bias windings 45, 46, 47 and 48 oppositely biases cores 30 and 31 with respect to cores 32 and 33.

The transductor system described above is of a well-known type wherein a current error in current flowing through bus 26 will increase the total D.-C. load on one pair of transductor cores. In the event of no current error, the bias current of one of the sets of transductor cores is transformed into the secondary circuit through resistor 50 where this current error will be equal to and in the same direction as the current error of the other pair of cores. The resistor 50, which is a potentiometer, may then be properly balanced so that there will be a zero potential difference appearing between points $a$ and $b$ when there is no current error. This balance will then be disturbed when the current in the main circuit differs from the value set by the reference current flowing through windings 41 through 44.

It is to be noted that the only purpose of the foregoing structure is to obtain a signal which indicates that the current has varied from some predetermined value, and indicates the magnitude of this variation. Any desired well-known system could be utilized for this purpose.

In the event of some current fluctuation, as described above, a potential will appear between points $a$ and $b$, and will be applied through the resistance-inductance circuit which includes inductance 60 and resistors 61 and 62 to the input circuit of a signal controlling transistor 63.

As will be shown more fully hereinafter, this current change signal will be injected into a second portion of the control circuit.

The line voltage fluctuation control portion of the circuit of FIG. 4 includes a potentiometer 70 connected directly across the lines 25 and 26. The voltage across resistor 70 is then balanced against a reference voltage set by the circuit including Zener diodes 71 and 72 and resistors 73 and 74a. The actual voltage which is to be maintained is controlled by the setting of potentiometer 70.

In the event that the line voltage fluctuates, a difference in potential will appear between points $c$ and $d$ which is applied directly to the resistance-capacitance circuit which includes capacitor 74 and resistors 75 and 76. Capacitor 74 corresponds to capacitor 11 of FIG. 1, and resistor 76 corresponds to resistor 10 of FIG. 1.

The itme constant ($T_s=RC$) of the resistance-capacitance circuit (10, 11 of FIG. 1 and 76, 74 of FIG. 4) should be equal to the time constant ($T_L=L/R$) of the load (12, 13 of FIG. 1 and 27 of FIG. 4).

The voltage across capacitor 74 is then connected to the input terminals of the control amplifier 24. This input voltage is then appropriately amplified in amplifier 24 to reduce or increase the output voltage by means of control reactor 23, as is required to return it to some predetermined value.

It is to be particularly noted that this arrangement has no circuit components therein which would introduce delays in the correction or errors in the correction. It is now seen that the output of the slow current change measuring portion of the system from transistor 63 is then superimposed upon the output of capacitor 74 through resistor 80 without interfering with the operation of capacitor 74.

It will be noted that in the arrangement of FIG. 4, the load voltage circuit was first balanced by a reference and was thereafter delivered to the capacitance circuit including capacitor 74, while the schematic arrangement of FIG. 1 indicated a direct balancing of capacitor voltage. Clearly, however, this does not change the basic concept, and permits the use of a simple circuit.

Although this invention has been described with respect to its preferred embodiments, it should be understood that many variations and modifications will now be obvious to those skilled in the art, and it is preferred therefore that the scope of this invention be limited not by the specific disclosure herein, but only by the appended claims.

The embodiments of the invention in which an exclusive privilege or property is claimed are defined as follows:

1. A constant current regulator for an electrical device having an output D.-C. current and output D.-C. voltage; said electrical device having an output voltage control means responsive to an input signal for controlling the output voltage thereof; said constant current regulator including output D.-C. current measuring means, output D.-C. voltage measuring means, first control circuit means connected to said output D.-C. voltage measuring means, and second control circuit means connected to said output D.-C. current measuring means; each of said first and second control circuit means being connected to said output voltage control means; said first control circuit means generating control signals solely responsive to variations of said output D.-C. voltage from some predetermined value; said second control circuit means generating control signals solely responsive to variations of said output D.-C. current from some predetermined value, said first control circuit having a high speed of response, and said second control circuit having a relatively low speed of response with respect to said first control circuit; the speed of response of said first control circuit being unaffected by the components of said second control circuit; said first control circuit including a series connected resistor and capacitor; and a voltage reference source; the difference in the output D.-C. voltage measured by said output D.-C. voltage measuring circuit and the voltage of said reference source being connected across said series connected resistor and capacitor; a current proportional to the voltage of said capacitor being injected into said output voltage control means.

2. The device as set forth in claim 1, the output current of said D.-C. current measuring circuit being injected into said output voltage control means to superimpose an output D.-C. current control signal from said second control circuit into the output D.-C. voltage control signal from said first control circuit.

3. The device as set forth in claim 2 wherein the output of said electrical device is connected to a highly inductive load.

4. The device as set forth in claim 3 wherein the time constant of the resistance-capacitance circuit is equal to the time constant of the load.

References Cited by the Examiner
UNITED STATES PATENTS

| | | | |
|---|---|---|---|
| 2,019,352 | 10/1935 | Livingston | 323—89 X |
| 2,190,757 | 2/1940 | Moyer | 321—16 |
| 2,707,262 | 4/1955 | Walker et al. | 321—25 X |
| 2,810,877 | 10/1957 | Silver | 321—25 X |
| 2,990,509 | 6/1961 | Hauck | 323—7 |
| 3,013,199 | 12/1961 | Hollingsworth et al. | 321—19 |

JOHN F. COUCH, *Primary Examiner.*

LLOYD McCOLLUM, *Examiner.*

W. E. RAY, *Assistant Examiner.*